United States Patent
Okada et al.

(10) Patent No.: US 10,550,258 B2
(45) Date of Patent: Feb. 4, 2020

(54) FLAME-RETARDANT RESIN COMPOSITION AND FLAME-RETARDANT RESIN MOLDED ARTICLE

(71) Applicant: TOYO STYRENE Co., LTD, Tokyo (JP)

(72) Inventors: Takaaki Okada, Ichihara (JP); Katsunori Konno, Ichihara (JP); Toshiharu Kurata, Ichihara (JP); Hiromi Daigo, Ichihara (JP)

(73) Assignee: TOYO STYRENE CO., LTD, Tokyo (JP)

( * ) Notice: Subject to any disclaimer, the term of this patent is extended or adjusted under 35 U.S.C. 154(b) by 0 days.

(21) Appl. No.: 15/720,804

(22) Filed: Sep. 29, 2017

(65) Prior Publication Data

US 2018/0094130 A1 Apr. 5, 2018

(30) Foreign Application Priority Data

Oct. 3, 2016 (JP) ................................. 2016-195540

(51) Int. Cl.
| | |
|---|---|
| *C08L 27/10* | (2006.01) |
| *C08K 5/00* | (2006.01) |
| *C08K 5/136* | (2006.01) |
| *C08L 25/06* | (2006.01) |
| *C08L 25/18* | (2006.01) |

(52) U.S. Cl.
CPC ............ *C08L 27/10* (2013.01); *C08K 5/0066* (2013.01); *C08K 5/136* (2013.01); *C08L 25/06* (2013.01); *C08L 25/18* (2013.01); *C08L 2201/02* (2013.01); *C08L 2312/04* (2013.01)

(58) Field of Classification Search
CPC ....................................................... C08L 27/10
See application file for complete search history.

(56) References Cited

U.S. PATENT DOCUMENTS

| | | | | |
|---|---|---|---|---|
| 6,111,020 | A * | 8/2000 | Oriani ...................... | C08L 23/08 521/144 |
| 8,076,380 | B2 * | 12/2011 | Noordegraaf .......... | C08J 9/0066 521/56 |
| 2001/0044488 | A1 | 11/2001 | Yasuda et al. | |
| 2008/0287559 | A1 | 11/2008 | King et al. | |
| 2011/0240906 | A1 | 10/2011 | Kram et al. | |
| 2014/0288203 | A1 | 9/2014 | Matsue et al. | |
| 2016/0272773 | A1 * | 9/2016 | Kutsumizu ............ | C08J 9/0061 |

FOREIGN PATENT DOCUMENTS

| | | | |
|---|---|---|---|
| JP | 8-3398 | A | 1/1996 |
| JP | 9-31276 | A | 2/1997 |
| JP | 11-172061 | A | 6/1999 |
| JP | 11-172062 | A | 6/1999 |
| JP | 2000-143994 | A | 5/2000 |
| JP | 2006008725 | A * | 1/2006 |
| JP | 2007-39606 | A | 2/2007 |
| JP | 2009-516019 | A | 4/2009 |
| JP | 2012-512942 | A | 6/2012 |
| JP | 2015-503007 | A | 1/2015 |

OTHER PUBLICATIONS

English machine translation of Iwata et al. JP-2006008725-A (Year: 2006).*
Decision of Patent (including an English translation thereof) issued in the corresponding Japanese Patent Application No. 2016-195540 dated Jul. 25, 2017.
Notification of Reasons for Refusal (including an English translation thereof) issued in the corresponding Japanese Patent Application No. 2016-195540 dated May 9, 2017.
Extended European Search Report, dated Feb. 27, 2018, for European Application No. 17191160.5.
Korean Notice of Preliminary Rejection (including an English translation thereof) issued in the corresponding Korean Patent Application No. 10-2017-0126000 dated Oct. 31, 2017.
Chinese Office Action and Search Report, dated Oct. 15, 2018 for Chinese Application No. 201710860373.X , with English translations.

* cited by examiner

*Primary Examiner* — Peter F Godenschwager
(74) *Attorney, Agent, or Firm* — Birch, Stewart, Kolasch & Birch, LLP

(57) ABSTRACT

To improve the thermal stability of a brominated polymer type flame retardant in a flame-retardant resin composition containing a styrene-based resin and the brominated polymer type flame retardant to provide a flame-retardant resin molded article in which occurrences of black foreign substances and discoloration decrease. The flame-retardant resin composition contains 0.8 to 15 parts by mass of a halogen capture agent, 0.8 to 7 parts by mass of an antioxidant, and 0.8 to 6 parts by mass of liquid paraffin based on a total of 100 parts by mass of a styrene-based resin and brominated polymer type flame retardant, and a content of bromine is 18 to 42% by mass.

5 Claims, No Drawings

FLAME-RETARDANT RESIN COMPOSITION AND FLAME-RETARDANT RESIN MOLDED ARTICLE

BACKGROUND OF THE INVENTION

Field of the Invention

The present invention relates to a flame-retardant resin composition containing a styrene-based resin and a brominated polymer type flame retardant, and a flame-retardant resin molded article using the flame-retardant resin composition.

Description of Related Art

Hexabromocyclododecane (HBCD) has been generally used as a flame retardant used for imparting flame retardancy to a styrene-based resin molded article. Since HBCD has a bioaccumulation property, is toxic for aquatic organisms, and is hardly decomposed, a brominated polymer type flame retardant is considered as a substitute (see Patent Literature 1).

However, the brominated polymer type flame retardant has insufficient thermal stability, and is thermally deteriorated to cause black foreign substances or discoloration when the brominated polymer type flame retardant is exposed to a high temperature in a process for mixing the brominated polymer type flame retardant with a styrene-based resin to manufacture a flame-retardant resin composition, and a molding process for molding a flame-retardant resin molded article using the flame-retardant resin composition. This may impair the appearance of the molded article.

Patent Literature 2 discloses a technique of adding an alkyl phosphite or an epoxy compound as a stabilizer when a brominated polymer type flame retardant is mixed with a resin as a method for eliminating the occurrence of such black foreign substances or discoloration.

PRIOR ART REFERENCE

Patent Literature

Patent Literature 1: Japanese Unexamined Patent Application Publication No. 2009-516019
Patent Literature 2: Japanese Unexamined Patent Application Publication No. 2012-512942

BRIEF SUMMARY OF THE INVENTION

Problem to be Solved by the Invention

An object of the present invention is to provide a flame-retardant resin composition containing a styrene-based resin and a brominated polymer type flame retardant, and a flame-retardant resin molded article.

Means for Solving the Problem

A first aspect of the present invention is a flame-retardant resin composition characterized by containing a styrene-based resin and a brominated polymer type flame retardant, a halogen capture agent, an antioxidant, and liquid paraffin, wherein a content of bromine is 18 to 42% by mass, and the flame-retardant resin composition contains 0.8 to 15 parts by mass of the halogen capture agent, 0.8 to 7 parts by mass of the antioxidant, and 0.8 to 6 parts by mass of the liquid paraffin based on a total of 100 parts by mass of the styrene-based resin and brominated polymer type flame retardant.

It is preferable that the flame-retardant resin composition of the present invention further contains a cresol novolac type epoxy resin; and the flame-retardant resin composition contains 4 to 25 parts by mass of the cresol novolac type epoxy resin based on a total of 100 parts by mass of the styrene-based resin and brominated polymer type flame retardant.

A second aspect of the present invention is a flame-retardant resin molded article characterized by containing the flame-retardant resin composition of the first aspect of the present invention.

Furthermore, a third aspect of the present invention is a flame-retardant resin molded article characterized by containing the flame-retardant resin composition of the first aspect of the present invention and a further styrene-based resin.

Effects of the Invention

The present invention can provide a flame-retardant resin composition in which the thermal stability of a brominated polymer type flame retardant is improved by using a halogen capture agent, an antioxidant, and liquid paraffin in combination as a stabilizer of the brominated polymer type flame retardant. Therefore, the occurrence of black foreign substances or discoloration when a molded article is obtained by molding the flame-retardant resin composition of the present invention is reduced, which provides a flame-retardant resin molded article having excellent appearance.

DETAILED DESCRIPTION OF THE INVENTION

Mode for Carrying out the Invention

A flame-retardant resin composition of the present invention (hereinafter referred to as a "resin composition") is characterized by using a halogen capture agent, an antioxidant, and liquid paraffin in combination as a heat stabilizer for a brominated polymer type flame retardant blended in a styrene-based resin, and a flame-retardant resin molded article of the present invention is obtained by molding the resin composition. The flame-retardant resin molded article of the present invention may be a flame-retardant resin molded article (hereinafter referred to as a "first molded article") obtained by molding the resin composition of the present invention as it is, or a flame-retardant resin molded article (hereinafter referred to as a "second molded article") in which a styrene-based resin is further added to the resin composition of the present invention to adjust the content of bromine to a lower level.

Hereinafter, the resin composition of the present invention, and the first and second molded articles will be described in detail.

Examples of the styrene-based resin used for the resin composition of the present invention include a homopolymer of styrene, a copolymer of styrene and copolymerizable monomer, and rubber-reinforced styrene-based resins thereof. Examples thereof include polystyrene, rubber reinforced polystyrene (HIPS), acrylonitrile-styrene copolymer resin (AS), acrylonitrile-butadiene-styrene copolymer resin (ABS), acrylonitrile-acrylic rubber-styrene copolymer resin (AAS), acrylonitrile-ethylene propylene rubber-styrene copolymer resin, acrylonitrile-chlorinated polyethylene-styrene copolymer resin, and styrene-butadiene copolymer resin. These styrene-based resins may be used singly or two or more of them may be used at the same time. Most preferred is polystyrene.

The brominated polymer type flame retardant used for the present invention is conventionally known, and those disclosed in Patent Literatures 1 and 2 can be used as they are. Preferably, a brominated copolymer having the following features (a) to (f) is preferably used:

(a) the brominated copolymer is a copolymer having butadiene and vinyl aromatic hydrocarbon as a monomer component;

(b) the content of the vinyl aromatic hydrocarbon monomer in the copolymer before bromination is 5 to 90% by mass;

(c) 1,2-butadiene is contained in butadiene; and (d) the weight average molecular weight (Mw) is 1000 or more;

(e) the content of unbrominated nonaromatic double bonds determined by $^1$H-NMR spectroscopy is less than 50% based on the content of the nonaromatic double bonds of the copolymer before bromination; and (f) the 5% weight reduction temperature obtained by thermogravimetric analysis (TGA) is 200° C. or higher.

Among them, examples thereof include a brominated styrene-butadiene block copolymer, a brominated styrene-butadiene random copolymer, and a brominated styrene-butadiene graft copolymer, which have the above features (a) to (f) and in which the vinyl aromatic hydrocarbon is styrene. In particular, a brominated styrene-butadiene block copolymer is preferred, and specific examples thereof include commercially available products such as "EMERALD INNOVATION 3000" manufactured by Chemtura Corporation and "FR 122 P" manufactured by ICL Company.

In the present invention, the addition amount of the brominated polymer type flame retardant is adjusted so that the content of bromine in the resin composition is 18 to 42% by mass.

The halogen capture agent used for the present invention is a component which captures free halogen produced during a process until the first molded article or the second molded article is obtained from the manufacturing process of the resin composition. Examples thereof include a dolomite-based compound, a hydrotalcite-based compound, a magnesium perchlorate compound, an aluminosilicate compound (zeolite or the like), and an organotin compound. Among them, the dolomite-based compound and the hydrotalcite-based compound are preferable from the viewpoint of suppressing the occurrence of black foreign substances. The hydrotalcite-based compound is one kind of naturally produced clay minerals represented by $Mg_6Al_2(OH)_{16}CO_3 \cdot nH_2O$ or the like. These halogen capture agents may be used alone, but the use of the dolomite-based compound with the hydrotalcite-based compound makes it possible to effectively suppress the occurrence of discoloration in addition to the effect of suppressing the occurrence of black foreign substances. The mass ratio of the dolomite-based compound to the hydrotalcite-based compound (dolomite-based compound/hydrotalcite-based compound) is preferably 10/90 to 90/10, and more preferably 30/70 to 70/30.

The addition amount of the halogen capture agent is preferably 0.8 to 15 parts by mass with respect to a total of 100 parts by mass of the styrene-based resin and brominated polymer type flame retardant. This range makes it possible to improve the thermal stability of the brominated polymer type flame retardant in the resin composition, to effectively suppress the occurrence of black foreign substances or discoloration due to the thermal deterioration of the brominated polymer type flame retardant in the first molded article and the second molded article, and to provide a molded article having excellent molding processability and excellent appearance. More preferred is 5 to 10 parts by mass.

Examples of the antioxidant used for the present invention include a phenol-based antioxidant, a sulfur-based antioxidant, and a phosphorus-based antioxidant. Preferred is a phenol-based antioxidant, and particularly preferred is a hindered phenol-based antioxidant. Examples of the hindered phenol-based antioxidant include octadecyl-3-(3,5-di-tert-butyl-4-hydroxyphenyl)propionate, ethylenebis(oxyethylene)bis[3-(5-tert-butyl-4-hydroxy-m-tolyl)propionate], 4,6-bis(octylthiomethyl)-o-cresol, 4,6-bis[(dodecylthio)methyl]-o-cresol, 2,4-dimethyl-6-(1-methylpentadecyl)phenol, tetrakis[methylene-3-(3,5-di-tert-butyl-4-hydroxyphenyl)propionate]methane, DL-α-tocopherol, 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, 4,4'-thiobis(6-tert-butyl-3-methylphenol), 1,1,3-tris(2-methyl-4-hydroxy-5-tert-butylphenyl)butane, and 4,4'-butylidenebis(3-methyl-6-tert-butylphenol).

The addition amount of the antioxidant is preferably 0.8 to 7 parts by mass with respect to a total of 100 parts by mass of the styrene-based resin and brominated polymer type flame retardant. This range makes it possible to improve the thermal stability of the brominated polymer type flame retardant in the resin composition, to effectively suppress the occurrence of black foreign substances or discoloration due to the thermal deterioration of the brominated polymer type flame retardant in the first molded article and the second molded article, and to provide a molded article having excellent appearance.

The liquid paraffin used for the present invention has no difficulty as long as it is known one (referred to as a white oil) defined as a mixture of extremely high purity liquid saturated hydrocarbons belonging to a lubricating oil distillate from the viewpoint of a boiling point. The addition amount of the liquid paraffin is preferably 0.8 to 6 parts by mass with respect to a total of 100 parts by mass of the styrene-based resin and brominated polymer type flame retardant. This range makes it possible to improve the thermal stability of the brominated polymer type flame retardant in the resin composition, to effectively suppress the occurrence of black foreign substances or discoloration due to the thermal deterioration of the brominated polymer type flame retardant without deteriorating flame resistance in the first molded article and the second molded article, and to provide a molded article having excellent appearance. More preferred is 3 to 5 parts by mass.

In the present invention, by further addition of a cresol novolac type epoxy resin, the thermal stability of the brominated polymer type flame retardant can be further improved. The addition amount of the cresol novolac type epoxy resin is preferably 4 to 25 parts by mass with respect to a total of 100 parts by mass of the styrene-based resin and brominated polymer type flame retardant. This range makes it possible to improve the thermal stability of the brominated polymer type flame retardant, to effectively suppress the occurrence of black foreign substance due to the thermal deterioration of the brominated polymer type flame retardant in the resin composition, and the first molded article and the second molded article using the resin composition, and to provide a molded article having excellent molding processability and excellent appearance. More preferred is 10 to 20 parts by mass.

Other additives can be added to the resin composition of the present invention as long as the effects of the present invention are not impaired. Examples thereof include: lubricants such as fatty acid-based lubricants, aliphatic amide-based lubricants, and metal soap-based lubricants; fillers such as talc, mica, and silica; reinforcing agents such as glass fibers; coloring agents such as pigments and dyes; flame-retardant auxiliary agents such as antimony trioxide; and antistatic agents such as nonionic surfactants and cationic surfactants.

The resin composition of the present invention can be manufactured by previously blending a styrene-based resin, a brominated polymer type flame retardant, a halogen capture agent, an antioxidant, liquid paraffin, and a cresol novolac type epoxy resin if necessary according to a known mixing technique to obtain a blended product, and thereafter melt-kneading the blended product. A preliminary blending method can be performed by using a mixer such as a mixer type mixing machine, a V type blender, or a tumbler type mixing machine or the like. The melt-kneading method is not particularly limited, and a known melting technique can be applied. Suitable examples of a melt-kneading apparatus used for melt-kneading include a uniaxial extruder, a special uniaxial extruder, and a biaxial extruder, and preferred is a biaxial extruder.

The resin composition of the present invention may be molded into the first molded article using the resin composition itself. However, by adding a further styrene-based resin (second styrene-based resin) to the resin composition of the present invention, a second molded article having a lower content of bromine can be obtained. Also in this case, the thermal stability of the brominated polymer type flame retardant is well maintained; the occurrence of black foreign substances or yellow discoloration is suppressed; and a molded article having excellent appearance is obtained. As the second styrene-based resin, a styrene-based resin exemplified as a styrene-based resin (hereinafter referred to as a "first styrene-based resin") used for manufacturing the above-described resin composition of the present invention is used. Preferably, the same styrene-based resin as the first styrene-based resin is used.

The resin composition of the present invention and the second styrene-based resin may be melt-kneaded to previously produce a second resin composition, followed by molding the second resin composition to obtain the second molded article. The resin composition of the present invention and the second styrene-based resin may be charged into a molding machine where the second molded article is directly obtained. When the second resin composition is previously produced, the melt-kneading apparatus is preferably used.

A method for molding the first molded article and the second molded article using the resin composition of the present invention is not limited. A method conventionally used for molding the flame-retardant resin molded article is suitably used. Extrusion molding is preferable, and preferably used for extrusion foam molding of a plate extruded foam. The plate extruded foam can be manufactured, for example, by blending the constituents of the resin composition and heating and melting the blended product, or heating and melting the previously produced resin composition, injecting a foaming agent at an arbitrary stage, followed by kneading to obtain a kneaded product, and adjusting the kneaded product to a foaming optimum temperature, and extruding and foaming the kneaded product in low pressure atmosphere (normal atmospheric pressure). A pressure when the foaming agent is injected is not particularly limited, and the foaming agent may not be gasified under a pressure higher than the internal pressure of an extruder or the like. When the plate extruded foam is manufactured, inorganic fillers such as silica, talc, and calcium carbonate can be used as a foam nucleating agent, if necessary. The density, foaming ratio, and average bubble diameter of the foam can be changed by adjusting the amount of the foaming agent or the amount of the foam nucleating agent. As the foaming agent, known ones such as lower hydrocarbons (such as propane, butane, pentane, and hexane); ethers (such as dimethyl ether and diethyl ether); ketones (such as dimethyl ketone and methyl ethyl ketone); alcohols such as methanol, ethanol, and propyl alcohol; halogenated hydrocarbons (such as trichloromonofluoromethane and methyl chloride); and inorganic gases (such as carbon dioxide gas and water) can be used each alone or as mixtures thereof. It is preferable to use lower hydrocarbons as a main component.

EXAMPLES

Hereinafter, the present invention will be specifically described with reference to examples, but the present invention is not limited to these examples.

[Styrene-Based Resin]

A styrene homopolymer (polystyrene) was used, which had a weight average molecular weight (Mw) of 200,000 and a methanol soluble component amount of 1.2% by mass. The weight average molecular weight (Mw) and the methanol soluble component amount were measured by the following methods.

<Measurement of Weight Average Molecular Weight (Mw)>

Measurement was carried out using gel permeation chromatography (GPC) under the following conditions.

GPC model: "Shodex GPC-101" manufactured by Showa Denko KK

Column: "PLgel 10 μm MIXED-C" manufactured by Polymer Laboratories Co., Ltd.

Mobile phase: chloroform

Sample concentration: 0.2% by mass

Temperature: 40° C. (oven)

Detector: differential refractometer

The molecular weight of each component in the present invention is obtained by calculating a molecular weight at each elution time from the elution curve of monodisperse polystyrene and calculating a molecular weight in terms of polystyrene.

<Measurement of Methanol Soluble Component Amount>

1 g of a sample was dissolved in 40 ml of a solvent (methyl ethyl ketone), and polystyrene was reprecipitated with 400 ml of a 10-fold amount of a poor solvent (methanol) to determine the mass of reprecipitated polystyrene, and the residue was taken as the methanol soluble component amount.

[Brominated Polymer Type Flame Retardant]

"EMERALD INNOVATION 3000" (a brominated styrene-butadiene block copolymer having the above features (a) to (f), content of bromine: 60% by mass) manufactured by Chemtura Corporation

[Halogen Capture Agent]

Halogen capture agent-1: "PLENLIZER HC-100B" (dolomite-based compound) manufactured by Ajinomoto Fine-Techno Co.

Halogen Capture Agent-2: "MC-63A" (hydrotalcite-based compound) manufactured by Nitto Kasei Co., Ltd.

[Antioxidant]

Antioxidant-1: "Irganox 1076" (octadecyl-3-(3,5-di-tert-butyl-4-hydroxyphenyl)propionate) manufactured by BASF Japan Antioxidant-2: "Irganox 245" (ethylenebis(oxyethylene) bis[3-(5-tert-butyl-4-hydroxy-m-tolyl)propionate] manufactured by BASF Japan

[Liquid Paraffin]
"Crestor N352" manufactured by Exxon Mobil Corporation

[Cresol Novolac Type Epoxy Resin]
"ARALDITE (registered trademark) ECN 1280" manufactured by Huntsman Japan Ltd.

Examples 1 to 12 and Comparative Examples 1 to 3

Components were charged into a mixer in blended amounts shown in Table 1, for preliminary blending. The blended product was supplied to a biaxial extruder ("TEM 26SS: 14 barrel" manufactured by Toshiba Corporation) using a metering feeder, and melt-kneaded and extruded under extrusion conditions of a cylinder temperature of 180° C., a total feed rate of 30 kg/hour, and a screw rotation speed of 300 rpm. The extruded strand was water-cooled and then led to a pelletizer to obtain resin composition pellets. No black foreign substances or discoloration occurred in any of the obtained pellets. The content of bromine in the obtained resin composition pellets was measured by the following method, and the following thermal stability was evaluated. The results are shown in Table 1.

[Method for Measuring Content of Bromine]
The content of bromine in the resin composition pellets was measured by combustion-ion chromatography under the following conditions.
Model: "AQF-100" manufactured by Mitsubishi Chemical Corporation and "DX-120" manufactured by Dionex Corporation
Combustion tube temperature: 1000° C.
Detector: Electrical conductivity detector
Column: AS 12A
Flow rate: 1.5 ml/min
Eluent composition: 2.7 mM $Na_2CO_3$+0.3 mM $NaHCO_3$
Sample introduction amount: 5 µl
Sample amount: 3 mg

[Initial Hue]
The resin composition pellets were molded under conditions of a resin temperature of 180° C. and a mold temperature of 40° C. by an injection molding machine ("J100E-P" manufactured by Japan Steel Works, Ltd.), to obtain a molded article having a length of 90 mm, a width of 90 mm, and a thickness of 2 mm. Based on JIS K 7105, the yellow index (YI) value of the molded article was confirmed using a spectrophotometer ("Σ 80" manufactured by Nippon Denshoku Industries Co., Ltd.), and evaluated according to the following criteria.
Good: The YI value is less than 35, which is good.
Poor: The YI value is 35 or more, which is poor.

[Evaluation of Thermal Stability]
10 g of the resin composition pellets were weighed, placed in a glass bottle, heated in a gear oven at 220° C. for 45 minutes, taken out, and cooled. After completely cooling, the occurrence state of black foreign substances was visually observed, and evaluated according to the following criteria.
Very good: No black foreign substances occurred.
Good: One to four black foreign substances occurred.
Poor: 5 or more black foreign substances occurred.

TABLE 1

| | Examples | | | | | | | | | | | | Comparative Examples | | |
|---|---|---|---|---|---|---|---|---|---|---|---|---|---|---|---|
| | 1 | 2 | 3 | 4 | 5 | 6 | 7 | 8 | 9 | 10 | 11 | 12 | 1 | 2 | 3 |
| Styrene-based resin + brominated polymer type flame retardant (parts by mass) | 100 | 100 | 100 | 100 | 100 | 100 | 100 | 100 | 100 | 100 | 100 | 100 | 100 | 100 | 100 |
| Halogen capture agent-1 (parts by mass) | 5 | 5 | 5 | 0.5 | 7 | 5 | 5 | 5 | 5 | 5 | 5 | 5 | — | 5 | 5 |
| Halogen capture agent-2 (parts by mass) | 5 | 5 | 5 | 0.5 | 7 | 5 | 5 | 5 | 5 | 5 | 5 | 5 | — | 5 | 5 |
| Antioxidant-1 (parts by mass) | 3 | 3 | 3 | 3 | 3 | 3 | 3 | 1 | 5 | 3 | 3 | — | 3 | — | 5 |
| Antioxidant-1 (parts by mass) | — | — | — | — | — | — | — | — | — | — | — | 3 | — | — | — |
| Liquid paraffin (parts by mass) | 4 | 4 | 4 | 4 | 4 | 4 | 4 | 4 | 4 | 1 | 5 | 4 | 4 | 4 | — |
| Cresol novolac type epoxy resin (parts by mass) | — | — | — | — | — | 5 | 22 | — | — | — | — | — | — | — | — |
| Content of bromine in composition (% by mass) | 30 | 20 | 40 | 30 | 30 | 30 | 30 | 30 | 30 | 30 | 30 | 30 | 30 | 30 | 30 |
| Initial hue | Good | Good | Good | Good | Good | Good | Good | Good | Good | Good | Good | Good | Good | Good | Poor |
| Evaluation of heat stability | Good | Good | Good | Good | Good | Very good | Very good | Good | Good | Good | Good | Good | Poor | Poor | Poor |

As shown in Table 1, it was found that the resin compositions of Examples 1 to 12 provide more excellent initial hue, less occurrence of black foreign substances even when heated at 220° C. for 45 minutes, and higher thermal stability of the brominated polymer type flame retardant in the resin composition, than those of the resin compositions of Comparative Examples 1 to 3. Therefore, it is found that black foreign substances or discoloration are reduced by molding the resin composition of the present invention, which provide a molded article having excellent appearance.

The invention claimed is:
1. A flame-retardant resin composition comprising:
a styrene-based resin;
a brominated polymer-based flame retardant;
a halogen capture agent;

a phenol-based antioxidant for improving a thermal stability of the brominated polymer-based flame retardant; and liquid paraffin, wherein a content of bromine is 18 to 42% by mass, the flame-retardant resin composition contains 0.8 to 15 parts by mass of the halogen capture agent, 0.8 to 7 parts by mass of the phenol-based antioxidant, and 0.8 to 6 parts by mass of the liquid paraffin based on a total of 100 parts by mass of the styrene-based resin and brominated polymer-based flame retardant, so as to improve the thermal stability of the brominated polymer-based flame retardant, the halogen capture agent contains at least a dolomite-based compound and a hydrotalcite-based compound, and a mass ratio of the dolomite-based compound to the hydrotalcite-based compound (dolomite-based compound/hydrotalcite-based compound) is 10/90 to 90/10, and the brominated polymer-based flame retardant satisfies the following requirements (a) to (f):

(a) the brominated polymer-based flame retardant comprises brominated copolymer containing butadiene and vinyl aromatic hydrocarbon as a monomer component;

(b) amount of the vinyl aromatic hydrocarbon monomer in the copolymer before bromination is 5 to 90% by mass;

(c) butadiene contains 1,2-butadiene;

(d) weight average molecular weight (Mw) is 1000 or more;

(e) amount of unbrominated nonaromatic double bonds determined by $^1$H-NMR spectroscopy is less than 50% based on the amount of the nonaromatic double bonds of the copolymer before bromination; and (f) a 5% weight reduction temperature obtained by thermogravimetric analysis (TGA) is 200° C. or higher.

2. The flame-retardant resin composition according to claim 1, further comprising a cresol novolac epoxy resin.

3. The flame-retardant resin composition according to claim 2, wherein 4 to 25 parts by mass of the cresol novolac epoxy resin is contained based on a total of 100 parts by mass of the styrene-based resin and brominated polymer-based flame retardant.

4. A flame-retardant resin molded article comprising the flame-retardant resin composition according to any one of claims 1-3.

5. A flame-retardant resin molded article comprising the flame-retardant resin composition according to any one of claims 1-3 and a second styrene-based resin.

* * * * *